W. J. FOSTER.
ELECTRICAL APPARATUS.
APPLICATION FILED FEB. 1, 1906.
924,977.
Patented June 15, 1909.
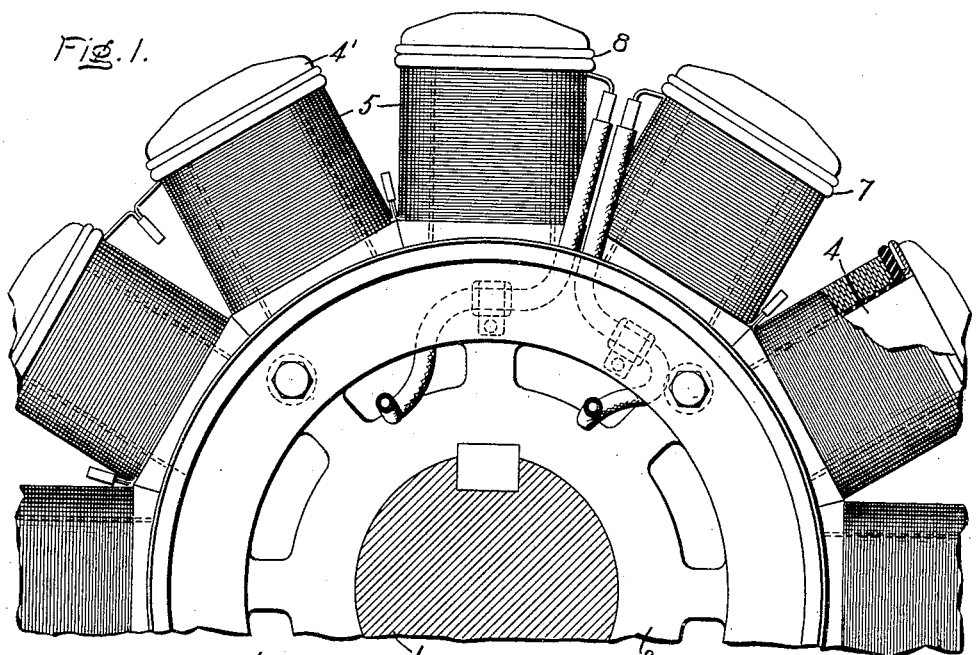
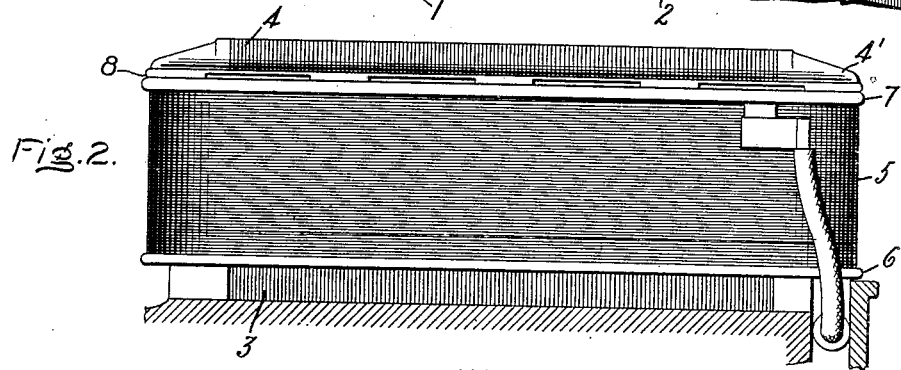
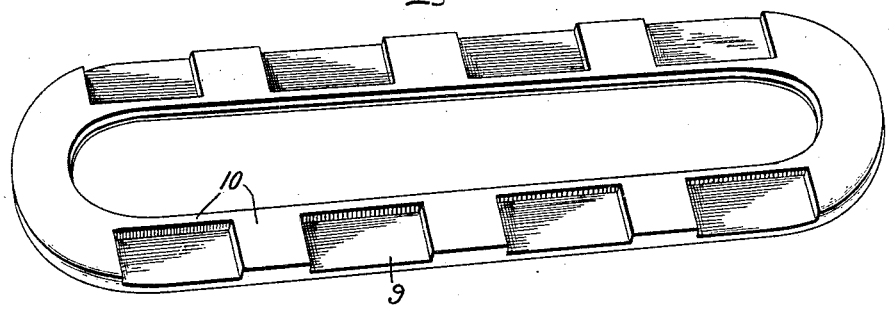
WITNESSES:
INVENTOR:
William J. Foster,
By Albert G. Davis,
Att'y.

UNITED STATES PATENT OFFICE.

WILLIAM J. FOSTER, OF SCHENECTADY, NEW YORK, ASSIGNOR TO GENERAL ELECTRIC COMPANY, A CORPORATION OF NEW YORK.

ELECTRICAL APPARATUS.

No. 924,977. Specification of Letters Patent. Patented June 15, 1909.

Application filed February 1, 1906. Serial No. 299,042.

*To all whom it may concern:*

Be it known that I, WILLIAM J. FOSTER, a citizen of the United States, residing at Schenectady, county of Schenectady, State of New York, have invented certain new and useful Improvements in Electrical Apparatus, of which the following is a specification.

My invention relates to electrical apparatus and more particularly to short-circuiting collars or conductors used upon pole pieces of dynamo-electric machines, and has for its object to so shape and arrange the conductors as to diminish the transfer of heat generated therein, by the passage of electricity through them, to the insulating collars or windings in contact therewith.

The various features of novelty which characterize my invention are pointed out with particularity in the claim annexed to and forming a part of this specification. For a better understanding of my invention, however, and the advantages possessed by it reference may be had to the accompanying drawings and descriptive matter in which I have illustrated and described in detail one of the many forms in which my invention may be embodied.

Of the drawings, Figure 1 is a partial end elevation with parts broken away and in section of the rotating field magnet of a dynamo electric machine; Fig. 2 is an elevation at right angles to Fig. 1 showing one of the field poles and a portion of the support therefor in section; Fig. 3 is a perspective view of a collar of conducting material which surrounds a field pole.

Referring to the drawings, 1 represents the shaft of the rotating field magnet of a dynamo electric machine such as a synchronous motor. On the shaft 1 is mounted a spider 2 which in turn supports a core 3 provided with outwardly extending radial portions 4. The core 3 and polar portions 4 are made of magnetic material which may be laminated. On each polar portion 4 is placed a winding 5 assembled between inner and outer collars 6 and 7 respectively, ordinarily formed of insulating material. Between the outer collar 7 and the laterally projecting pole tip portions 4' is placed a collar or member 8.

The collar or member 8 is formed of conducting material, such as copper or brass. Pockets or recesses 9 are formed in the side of the member 8 adjacent the insulating collar 7. As shown, the pockets 9 are separated and outlined by ribs, lugs or projecting portions 10 integral with the member 8. The purpose of the member 8 is two-fold; it forms a mechanical support for the insulating collar 7, and it serves as a short circuited conductor to minimize variations in the magnetic flux passing through the pole which it surrounds.

As is well known, variations in the flux passing through one of the field poles causes currents to flow in the member 8 surrounding the pole. The current flow thus produced tends to choke down the flux variations which produce it. With machines of the character described the current thus produced in the member 8 is frequently sufficient to generate considerable heat in the member. When the member 8 is in the form of a smooth collar as has heretofore ordinarily been used, the heat thus generated has been found to injuriously affect the insulating material between it and the winding 5. By forming the spaces 9 between the body portion of the member 8 and the adjacent insulating member 7, I have greatly reduced the heat transferred from the member 8 to the insulation. With the construction disclosed the major portions of the current flow through the member 8 is through the portion of the member at one side of the projecting portions 10. Less heat is generated therefore in the projections 10 than in the body of the member 8. Moreover the spaces 9 permit of certain ventilation which tends to cool the projecting portions 10 and thus diminish the temperature of the portions of the member 8 in contact with the insulation.

While the form of my invention disclosed has been found to give excellent results in commercial practice it will be readily understood by all those skilled in the art that many changes may be made in the form in which my invention is embodied without departing from its spirit, and that my invention is capable of use in many relations other than that hereinbefore described, and I do not wish the claim hereinafter made to be limited to the particular embodiment disclosed more than is made necessary by the state of the art.

What I claim as new and desire to secure by Letters Patent of the United States is:—

In a dynamo-electric machine, a field pole, a coil surrounding said pole, an insulating collar at one end of the coil, and a short circuiting electrical conductor also surrounding said pole and in engagement with said insulating collar, said conductor having ribs or lugs outlining pockets on the side thereof adjacent said insulating collar to diminish the transfer of heat from the conductor to the insulating collar.

In witness whereof I have hereunto set my hand this 31st day of January, 1906.

WILLIAM J. FOSTER.

Witnesses:
BENJAMIN B. HULL,
HELEN ORFORD.